(12) United States Patent
Kang et al.

(10) Patent No.: US 9,989,694 B2
(45) Date of Patent: Jun. 5, 2018

(54) ELECTRONIC APPLIANCE

(71) Applicant: Samsung Electronics Co., Ltd., Suwon-si (KR)

(72) Inventors: Jung Hye Kang, Suwon-si (KR); Ah Hyun Bae, Hwaseong-si (KR); Ki Du Kim, Suwon-si (KR); Jin O Kim, Seoul (KR)

(73) Assignee: Samsung Electronics Co., Ltd. (KR)

( * ) Notice: Subject to any disclaimer, the term of this patent is extended or adjusted under 35 U.S.C. 154(b) by 0 days. days.

(21) Appl. No.: 14/757,665

(22) Filed: Dec. 23, 2015

(65) Prior Publication Data
US 2016/0178833 A1     Jun. 23, 2016

(30) Foreign Application Priority Data
Dec. 23, 2014  (KR) .......................... 10-2014-0187458

(51) Int. Cl.
*F21V 8/00*  (2006.01)
*F21V 23/04*  (2006.01)
(Continued)

(52) U.S. Cl.
CPC ............ *G02B 6/0076* (2013.01); *F21V 23/04* (2013.01); *F21V 33/0044* (2013.01);
(Continued)

(58) Field of Classification Search
CPC .. G02B 6/0076; G02B 6/0023; G02B 6/0055; G02B 6/0065; G02B 6/0068;
(Continued)

(56) References Cited

U.S. PATENT DOCUMENTS 4,016,534 A * 4/1977 Kobayashi ............... B60Q 9/00
                                                               340/461
5,926,601 A *  7/1999 Tai ....................... G02B 6/0076
                                                                349/62
(Continued)

FOREIGN PATENT DOCUMENTS

CN       101610313 A    12/2009
CN       201435069 Y     3/2010
(Continued)

OTHER PUBLICATIONS

Extended European Search Report for EP 15202262 dated Apr. 20, 2016.
(Continued)

*Primary Examiner* — Bryon T Gyllstrom
(74) *Attorney, Agent, or Firm* — McAndrews, Held & Malloy, Ltd.

(57) ABSTRACT

There is provided an electronic appliance having an improved structure enabling multi-image conversion. The electronic appliance includes a display device configured to display a plurality of images, wherein the display device includes first and second images that are selectively displayed on a screen. A first light-guiding layer is disposed between the screen and a second light-guiding layer, and two light sources disposed to selectively illuminate the first light-guiding layer and the second light-guiding layer. The second light-guiding layer has a thickness that is 25% to 45% greater than a thickness of the first light-guiding layer such that an intensity of light that is emitted from the first light source and introduced into the second light-guiding layer is greater than an intensity of light that is emitted from the second light source and introduced into the first light-guiding layer.

23 Claims, 14 Drawing Sheets

(51) Int. Cl.
*F21V 33/00* (2006.01)
*G09F 13/18* (2006.01)
*G09F 23/00* (2006.01)
*G09F 13/22* (2006.01)

(52) U.S. Cl.
CPC ......... *G02B 6/0023* (2013.01); *G02B 6/0055* (2013.01); *G02B 6/0065* (2013.01); *G02B 6/0068* (2013.01); *G02B 6/0083* (2013.01); *G02B 6/0093* (2013.01); *G09F 13/18* (2013.01); *G09F 23/0058* (2013.01); *G09F 2013/185* (2013.01); *G09F 2013/1863* (2013.01); *G09F 2013/222* (2013.01)

(58) Field of Classification Search
CPC ..... G02B 6/0083; G02B 6/0093; F21V 23/04; F21V 33/0044; G09F 13/18; G09F 23/0058
USPC .......................................... 362/608
See application file for complete search history.

(56) References Cited

U.S. PATENT DOCUMENTS

| | | | | |
|---|---|---|---|---|
| 6,308,444 | B1* | 10/2001 | Ki | G09F 13/18 362/293 |
| 6,648,486 | B2* | 11/2003 | Harbers | G02B 6/0036 362/613 |
| 6,854,854 | B2* | 2/2005 | Hoelen | G02B 6/0076 362/23.08 |
| 7,154,570 | B2* | 12/2006 | Lee | G02B 6/0043 349/58 |
| 7,223,005 | B2* | 5/2007 | Lamb | G02B 6/0076 349/62 |
| 7,246,932 | B2* | 7/2007 | Burtsev | G02B 6/0001 362/23.16 |
| 7,277,079 | B2* | 10/2007 | Kobayashi | G02F 1/1336 345/102 |
| 7,303,322 | B2* | 12/2007 | Lamb | G02B 6/0076 362/19 |
| 7,762,704 | B2* | 7/2010 | Brychell | G02B 6/006 362/615 |
| 2009/0219734 | A1* | 9/2009 | Sawada | G02B 6/0076 362/616 |
| 2010/0259485 | A1* | 10/2010 | Chuang | G02B 6/006 345/173 |
| 2012/0147584 | A1 | 6/2012 | Wu et al. | |
| 2013/0077346 | A1 | 3/2013 | Chen | |
| 2014/0097356 | A1 | 4/2014 | Park et al. | |

FOREIGN PATENT DOCUMENTS

| | | |
|---|---|---|
| CN | 201514615 U | 6/2010 |
| CN | 201716944 U | 1/2011 |
| CN | 202050396 U | 11/2011 |
| DE | 29801008 U1 | 3/1998 |
| DE | 102006053906 A1 | 5/2008 |
| EP | 2136225 A1 | 12/2009 |
| JP | 2000075290 A | 3/2000 |
| JP | 2002352616 A | 12/2002 |
| KR | 20110112714 | 10/2011 |

OTHER PUBLICATIONS

Chinese Office Action Appln No. 201510977764.0 dated Jan. 11, 2018 (13 pages).

* cited by examiner

| FIRST LIGHT-GUIDING LAYER THICKNESS(μm) | FIRST LIGHT-GUIDING LAYER BRIGHTNESS(cd) | SECOND LIGHT-GUIDING LAYER THICKNESS(μm) | THICKNESS INCREMENTAL RATE | BRIGHTNESS (cd) | UNIFORMITY COMPARISON |
|---|---|---|---|---|---|
| 0.7 | 11.3 | 0.7 | 0% | 8.2 | 37.80% |
| | | 0.8 | 14.29% | 9.3 | 21.51% |
| | | 0.9 | 28.57% | 10.8 | 4.63% |
| | | 1.0 | 42.86% | 11.7 | -3.42% |
| | | 1.1 | 57.14% | 12.6 | -10.32% |
| | | 1.2 | 71.43% | 13.1 | -13.74% |

FIG. 10

ELECTRONIC APPLIANCE

CROSS-REFERENCE TO RELATED APPLICATION

This application claims the benefit of Korean Patent Application No. 2014-0187458, filed on Dec. 23, 2014 in the Korean Intellectual Property Office, the disclosure of which is incorporated herein by reference.

BACKGROUND

The present disclosure relates to an electronic appliance, and specifically, to an electronic appliance having an improved structure enabling multi-image conversion.

Recently, demands of consumers for electronic appliances having various functions have increased significantly. Light diffusion and light reflection technology using various light sources and optical materials can be applied to display these various functions of electronic appliances on a display unit.

In general, electronic appliances employ a direct type display unit in which light emitting diodes (LED) are disposed at certain intervals on a rear surface of the display unit in order to display various functions on the display unit.

However, since each shape to be displayed on the display unit needs light emitting diodes (LEDs) disposed on the rear surface of the display unit in the direct type display unit, it is difficult to avoid production cost increase due to the increased number of light emitting diodes (LEDs). Also, when there is a deviation among the plurality of light emitting diodes (LEDs), the optical quality becomes uneven and halftone may result.

SUMMARY

According to an aspect of the present disclosure, there is provided an electronic appliance having an improved structure enabling uniformity of optical quality to be improved.

According to another aspect of the present disclosure, there is provided an electronic appliance having an improved structure enabling multiple images to be selectively displayed.

According to still another aspect of the present disclosure, there is provided an electronic appliance having an improved structure enabling multiple images to be efficiently disposed.

According to an aspect of the present disclosure, there is provided an electronic appliance, including a display device configured to display a plurality of images, wherein the display device includes a first image and a second image that are selectively displayed; a first light-guiding layer that is disposed to be below a screen; a second light-guiding layer that is disposed below the first light-guiding layer; and at least one light source that is disposed to selectively illuminate the first light-guiding layer and the second light-guiding layer; and wherein the second light-guiding layer has a thickness that is 25% to 45% greater than a thickness of the first light-guiding layer such that an intensity of light that is emitted from the at least one light source and introduced into the second light-guiding layer is greater than an intensity of light that is emitted from the at least one light source and introduced into the first light-guiding layer.

The at least one light source may include a first light source configured to emit a first light and a second light source configured to emit a second light that are disposed to face the first light-guiding layer and the second light-guiding layer.

The display device may further include a light shielding unit configured to guide the first light and the second light to the first light-guiding layer and the second light-guiding layer, respectively.

The light shielding unit may include a first light shielding unit that is provided between the first light source and the second light-guiding layer such that the first light is introduced into the first light-guiding layer, and a second light shielding unit that is provided between the second light source and the first light-guiding layer such that the second light is introduced into the second light-guiding layer.

The second image may be provided on the second light-guiding layer.

The display device may further include a reflection layer that is disposed to face the first light-guiding layer with the second light-guiding layer in between such that light emitted from the at least one light source into the second light-guiding layer is able to move toward the screen, and the second image may be provided between the second light-guiding layer and the reflection layer.

The first image and the second image may be printed on the first light-guiding layer and the reflection layer, respectively, through laser etching.

The electronic appliance may include an uneven structure to effectively alter a refractive index of the second light-guiding layer.

The uneven structure may be formed by at least one of press processing and laser processing.

The display device may further include a protection cover, which has a surface on which the screen is formed and is disposed on the first light-guiding layer, having an anti-scratch property.

The first light-guiding layer and the second light-guiding layer may include at least one of polycarbonate (PC) material, polyurethane (PU) material, polyethylene terephthalate (PET) material and polymethyl methacrylate (PMMA) material.

The display device may further include a printed circuit board that is disposed below the second light-guiding layer; and a dome switch configured to deliver an electrical signal to the printed circuit board such that the at least one light source selectively illuminates the first light-guiding layer and the second light-guiding layer and the first image and the second image are selectively displayed.

The dome switch may be provided on the printed circuit board, and a pressing unit protruding toward the dome switch may be provided on the second light-guiding layer to selectively press the dome switch.

The display device may further include a printed circuit board that is disposed to face the second light-guiding layer; and a touch unit that is disposed over the second light-guiding layer with the first light-guiding layer in between and electrically connected to the printed circuit board such that the at least one light source selectively illuminates the first light-guiding layer and the second light-guiding layer, and the first image and the second image are selectively displayed.

According to another aspect of the present disclosure, there is provided an electronic appliance including a display device wherein the display device includes a plurality of image implementing units that include a plurality of images that are selectively displayed, at least one light-guiding layer on which the plurality of images are provided and at least one light source that is provided to illuminate the at least one light-guiding layer, and a light shielding unit that separates adjacent ones of the plurality of image implementing units such that light emitted from any light source among the plurality of image implementing units and light emitted from any other light source among the plurality of image implementing units do not interfere with each other.

The at least one light-guiding layer may include a first light-guiding layer that is disposed below the screen and on which a first image is provided; and a second light-guiding layer that is below the first light-guiding layer and on which a second image is provided. The second light-guiding layer may have a thickness that is 25% to 45% greater than a thickness of the first light-guiding layer such that brightness of light that passes through at least one of the first light-guiding layer and the second light-guiding layer and is emitted to the screen becomes uniform.

The at least one light source may include a first light source and a second light source that are disposed to face the at least one light-guiding layer in between.

The light shielding unit may be disposed along a perimeter of each of the plurality of image implementing units.

The display device may further include a printed circuit board that is disposed below the screen with the plurality of image implementing units and the light shielding unit in between, and a dome switch that is electrically connected to the printed circuit board such that the at least one light source selectively illuminates the at least one light-guiding layer.

The display device may further include a protection cover that has a surface on which the screen is formed and has an anti-scratch property.

A light shielding film may be disposed between the protection cover and the at least one light source to prevent light emitted from the at least one light source from moving directly to the protection cover.

The display device may further include a printed circuit board on which the plurality of image implementing units and the light shielding unit are disposed, and a touch unit that is electrically connected to the printed circuit board such that the at least one light source selectively illuminates the at least one light-guiding layer and has a surface on which the screen is formed.

The display device may further include a printed circuit board configured to house circuitry and/or elements to control at least some of the display device, and a touch unit configure to receive input and provide the input to the printed circuit board.

BRIEF DESCRIPTION OF THE DRAWINGS

These and/or other aspects of the disclosure will become apparent and more readily appreciated from the following description of the embodiments taken in conjunction with the accompanying drawings, of which:

FIG. 10 is a table showing uniformity of optical quality according to a thickness ratio of a first light-guiding layer and a second light-guiding layer in the electronic appliance according to an embodiment of the present disclosure.

DETAILED DESCRIPTION

Exemplary embodiments according to the present disclosure will be described below in detail with reference to the accompanying drawings. Meanwhile, the terms "above," "below," "up," "down," "distal end," "rear end," "upper part," "lower part," "top end," and "bottom end," used in the following description are defined based on the drawings, and shapes and positions of components are limited by such terms. Various drawings show arrows A and B, and where arrow A points is up and where arrow B points is down. Where arrows A and B are not shown in a drawing, the directions up and down should be inferred from arrangements of similar parts in other drawings. Hereinafter, a plurality of images 510 and 520 may be used to generally refer to characters, figures, numbers and the like.

Figure 1:
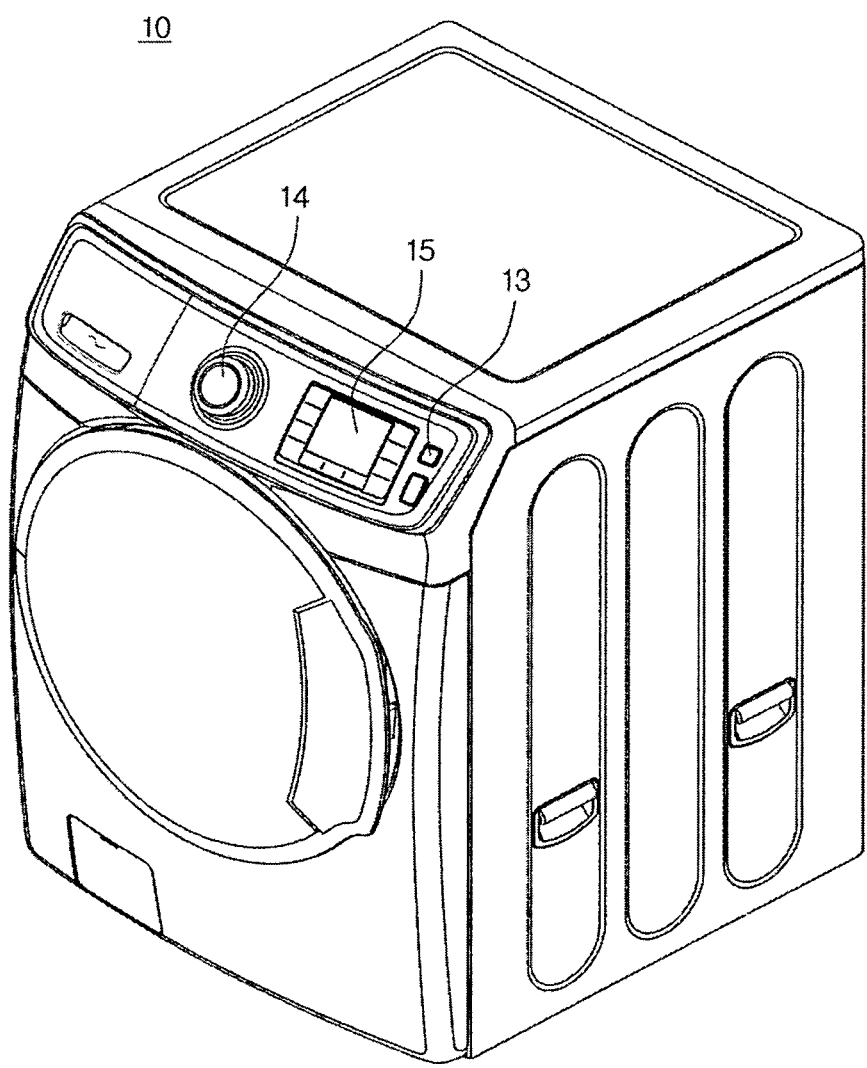
FIG. 1 is an exemplary diagram of an electronic appliance according to an embodiment of the present disclosure.
Figure 2:
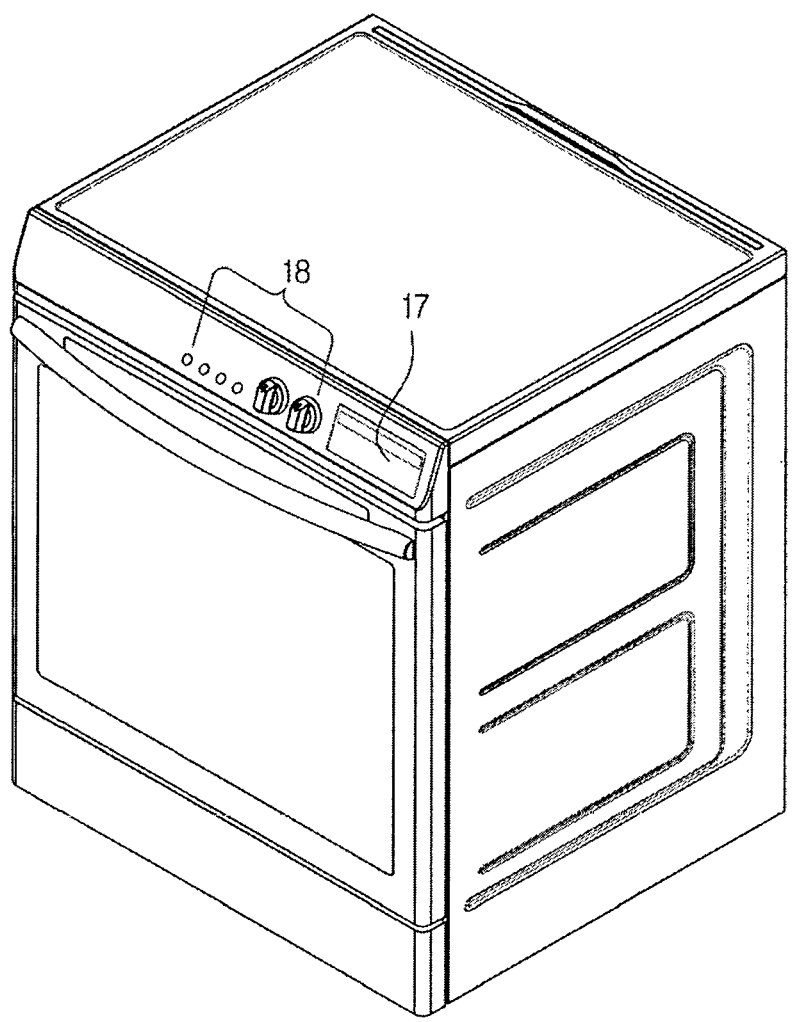
FIG. 2 is another exemplary diagram of the electronic appliance according to an embodiment of the present disclosure.

FIG. 1 is an exemplary diagram of an electronic appliance according to an embodiment of the present disclosure. FIG. 2 is another exemplary diagram of the electronic appliance according to an embodiment of the present disclosure.

As illustrated in FIG. 1, display devices 100, 200, 300, and 400 may be implemented as a display unit 15 of a washing machine 10. The display unit 15 of the washing machine 10 may display an operation selected with a power button 14 and on a manipulating unit 13 for the user's information. Also, the display unit 15 of the washing machine 10 may be used to perform functions of both the power button 14 and the manipulating unit 13. That is, the user can use the display unit 15 to turn the washing machine 10 on or off. Also, the display unit 15 may be used to perform a function of the manipulating unit 13 so that the user can select various modes of the washing machine 10. When the display unit 15 of the washing machine 10 performs functions of both the power button 14 and the manipulating unit 13, the power button 14 and the manipulating unit 13 illustrated in FIG. 1 can be omitted.

As illustrated in FIG. 2, the display devices 100, 200, 300, and 400 may be implemented as a display unit 17 of a cooking device 20. The display unit 17 of the cooking device 20 may display various pieces of operation information of the cooking device 20. Also, the display unit 17 of the cooking device 20 may be able to perform a function of a manipulating unit 18. When the display unit 17 of the cooking device 20 is able to perform the function of the manipulating unit 18, the manipulating unit 18 illustrated in FIG. 2 can be omitted.

The electronic appliance to which the display devices 100, 200, 300, and 400 can be applied may include all electronic appliances that can include a display unit such as a refrigerator, a dishwasher, an air conditioner, and a cleaner in addition to the washing machine 10 and the cooking device 20.

Figure 3:
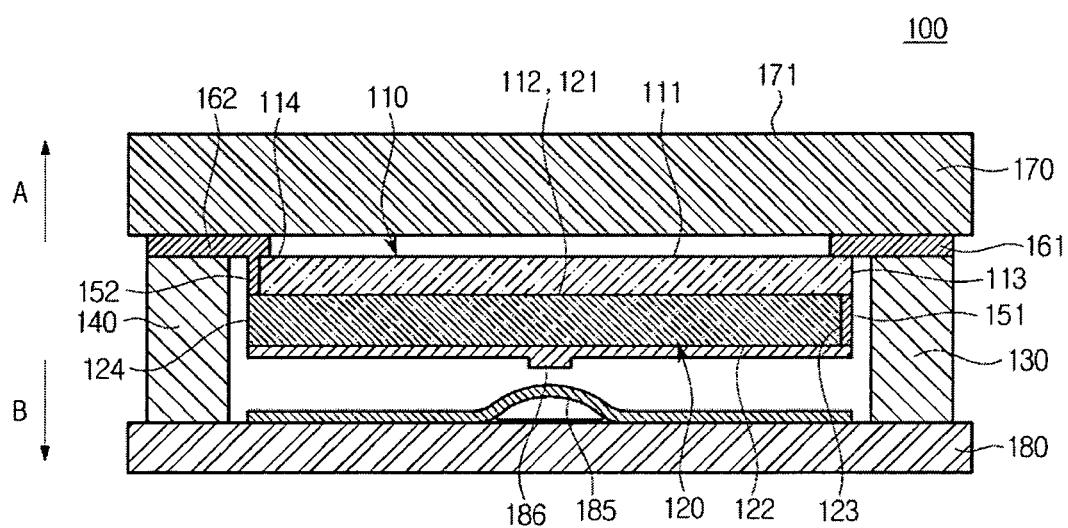
FIG. 3 is a cross-sectional view illustrating a display device according to a first embodiment in the electronic appliance.

FIG. 3 is a cross-sectional view illustrating a display device according to a first embodiment in the electronic appliance. Hereinafter, as explained previously, and as shown in FIG. 3, the direction of arrow A is up and the direction of arrow B is down. "Up" may also be referred to as the first direction A, and "down" may also be referred to as the second direction B.

As illustrated in FIG. 3, the display device 100 may include at least one of light-guiding layers 110 and 120.

At least one of the light-guiding layers 110 and 120 may perform a function of uniformly spreading light emitted from at least one of light sources 130 and 140 across the entire region of the screen 171.

The first light-guiding layer 110 and the first light-guiding layer 120 may be made of a material having transparency and flexibility. As an example, the first light-guiding layer 110 and the first light-guiding layer 120 may be made from at least one of polycarbonate (PC), polyurethane (PU), polyethylene terephthalate (PET) and polymethyl methacrylate (PMMA).

The light-guiding layers 110 and 120 may include the first light-guiding layer 110 and the second light-guiding layer 120. The first light-guiding layer 110 may be positioned above the second light-guiding layer 120 along the thickness direction of the display device 100. In other words, the first light-guiding layer 110 may be disposed to face in the first direction A, and the second light-guiding layer 120 may be disposed to face in the second direction B.

The first light-guiding layer 110 may be disposed to be adjacent to the screen 171. The first image 510 (refer to FIG. 4a) may be provided on the first light-guiding layer 110. As an example, the first image 510 may be provided on a second surface 112 of the first light-guiding layer 110.

The first light-guiding layer 110 may include a first surface 111, the second surface 112, a third surface 113 and a fourth surface 114. The first surface 111 faces the first direction A, and the second surface 112 faces the second direction B. The third surface 113 and the fourth surface 114 are positioned between the first surface 111 and the second surface 112. The third surface 113 and the fourth surface 114 may face the light sources 130 and 140, respectively. Specifically, the third surface 113 may face the first light source 130, and the fourth surface 114 may face the second light source 140.

As can be seen, the second light-guiding layer 120 may be disposed below the screen 171 and the first light-guiding layer 110. In other words, the second light-guiding layer 120 may be disposed below protection cover 170 with the first light-guiding layer 110 in between.

The second light-guiding layer 120 may include a first surface 121, a second surface 122, a third surface 123 and a fourth surface 124. The first surface 121 faces in the first direction A, and the second surface 122 faces in the second direction B. The third surface 123 and the fourth surface 124 are positioned between the first surface 121 and the second surface 122. The third surface 123 and the fourth surface 124 may face the light sources 130 and 140, respectively. Specifically, the third surface 123 may face the first light source 130, and the fourth surface 124 may face the second light source 140.

The second light-guiding layer 120 may have a greater thickness than the first light-guiding layer 110 such that an intensity of light emitted from at least one of the light sources 130 and 140 and introduced into the second light-guiding layer 120 is greater than an intensity of light emitted from at least one of the light sources 130 and 140 and introduced into the first light-guiding layer 110. Specifically, the second light-guiding layer 120 may have a thickness that is 25% to 45% greater than a thickness of the first light-guiding layer 110 such that the brightness and uniformity of light that passes through only the first light-guiding layer 110 to the screen 171 is substantially the same as the brightness and uniformity of light that passes through the second light-guiding layer 120 and the first light-guiding layer 110 to the screen 171.

In an embodiment, the light emitted from the first light source 130 passes through the first light-guiding layer 110 on its way to the screen 171, and the light emitted from the second light source 140 sequentially passes through the second light-guiding layer 120 and the first light-guiding layer 110 on its way to the screen 171. Since light emitted from the second light source 140 passes through the second light-guiding layer 120 and the first light-guiding layer 110 on its way to the screen 171, more light from the second light source 140 is lost than light is lost from the first light source 130 that passes through only the first light-guiding layer 110 on its way to the screen 171. Therefore, light emitted from the first light source 130 and light emitted from the second light source 140 may have non-uniform brightness or luminance when viewed on the screen 171. As a method of addressing such a problem, the first light-guiding layer 110 and the second light-guiding layer 120 may be set to have different thicknesses. A thickness difference between the first light-guiding layer 110 and the second light-guiding layer 120 will be described below in detail with reference to FIG. 10.

An implementation described above shows two light-guiding layers. However, other implementations need not be limited to two light-guiding layers. Various implementations may have different number of light-guiding layers.

The display device 100 may further include at least one of the light sources 130 and 140. The light sources 130 and 140 may be disposed to selectively illuminate the first light-guiding layer 110 and the second light-guiding layer 120. The first light source 130 and second light source 140 may be one of light emitting diode (LED) and electro-luminescence (EL).

The light sources 130 and 140 may include the first light source 130 and second light source 140 that are disposed to provide light to at least one of the light-guiding layers 110 and 120 in between. The first light source 130 may provide light to the third surface 113 of the first light-guiding layer 110 and the third surface 123 of the second light-guiding layer 120. The second light source 140 may provide light to the fourth surface 114 of the first light-guiding layer 110 and the fourth surface 124 of the second light-guiding layer 120.

The light emitted from at least one of the first light source 130 and the second light source 140 may exhibit a color.

The display device 100 may further include the light shielding units 151 and 152. The light shielding units 151 and 152 may guide light emitted from the first light source 130 and the second light source 140 such that light emitted from the first light source 130 and the second light source 140 can be introduced into the first light-guiding layer 110 and the second light-guiding layer 120, respectively.

The light shielding units 151 and 152 may include the first light shielding unit 151 and the second light shielding unit 152. The first light shielding unit 151 may be provided between the first light source 130 and the second light-guiding layer 120 such that light emitted from the first light source 130 is introduced in to the first light-guiding layer 110. In other words, the first light shielding unit 151 may be provided on the third surface 123 of the second light-guiding layer 120 to prevent light emitted from the first light source 130 from being introduced in to the second light-guiding layer 120. The second light shielding unit 152 may be provided between the second light source 140 and the first light-guiding layer 110 such that light emitted from the second light source 140 is introduced in to the second light-guiding layer 120. In other words, the second light shielding unit 152 may be provided on the fourth surface 114 of the first light-guiding layer 110 to prevent light emitted from the second light source 140 from being introduced in to the first light-guiding layer 110.

The display device 100 may further include the light shielding films 161 and 162. The light shielding films 161 and 162 may be disposed to prevent the light emitted from the light sources 130 and 140 from moving directly to the screen 171. In other words, the light shielding films 161 and 162 may be disposed to prevent the light emitted from at least one of the light sources 130 and 140 from moving directly in the first direction A without passing through at least one of the light-guiding layers 110 and 120.

The light shielding films 161 and 162 may be disposed between the protection cover 170 and at least one of the light sources 130 and 140 to prevent the light emitted from at least one of the light sources 130 and 140 from moving directly to the protection cover 170.

The first light shielding film 161 may be disposed between the protection cover 170 and the first light source 130. The first light shielding film 161 may be disposed on a top surface of the first light source 130. The second light shielding film 162 may be disposed between the protection cover 170 and the second light source 140. The second light shielding film 162 may be disposed on a top surface of the second light source 140.

The second light shielding film 162 and the second light shielding unit 152, which are adjacent to each other, can be integrally formed.

The light shielding units 151 and 152 and the light shielding films 161 and 162 may include a light shielding tape.

The display device 100 may further include the protection cover 170.

The screen 171 may be formed on a surface of the protection cover 170. In other words, the surface of the protection cover 170 may be defined as the screen 171. Or, the screen 171 may be formed by performing an additional process on the surface of the protection cover 170. The protection cover 170 may be made of a material having an anti-scratch property. As an example, the protection cover 170 may be made of at least one of polycarbonate (PC) and polyethylene terephthalate (PET).

The protection cover 170 may be disposed over at least one of the light-guiding layers 110 and 120 along the thickness direction of the display device 100. Specifically, the protection cover 170 may be disposed over the first light-guiding layer 110 along the thickness direction of the display device 100.

The display device 100 may further include a printed circuit board 180. The printed circuit board 180 may be disposed below the light-guiding layers 110 and 120 along the thickness direction of the display device 100. Specifically, the printed circuit board 180 may be disposed to face the second light-guiding layer 120.

The printed circuit board 180 may provide a first power supply path (not illustrated) configured to supply power to the first light source 130 and a second power supply path (not illustrated) configured to supply power to the second light source 140.

The display device 100 may further include a switch 185 that is disposed to selectively switch on/off the first light source 130 and the second light source 140. The switch 185 may deliver an electrical signal to the printed circuit board 180 such that at least one of the light sources 130 and 140 selectively illuminates the first light-guiding layer 110 and the second light-guiding layer 120, and, therefore, the first image 510 and the second image 520 can be selectively displayed. In other words, the switch 185 can selectively connect or block the first power supply path and the second power supply path that are provided in the printed circuit board 180.

The switch 185 may be, for example, a dome switch, but the present disclosure is not limited so. Any of various types of switches appropriate for an implementation may be used. However, in the remainder of the present disclosure the switch 185 will be assumed to be a dome switch.

The switch 185 may be provided on the printed circuit board 180. The switch 185 may be selectively pressed by a pressing unit 186 provided on the second light-guiding layer 120. The pressing unit 186 may protrude toward the switch 185 so that the switch 185 can be selectively pressed. Specifically, the pressing unit 186 may be provided on the second surface 122 of the second light-guiding layer 120 to protrude toward the switch 185. In another embodiment, the pressing unit 186 may be provided on a surface of a reflection layer 190 to protrude toward the switch 185.

The display device 100 may further include the plurality of images 510 and 520 that are selectively displayed. The plurality of images may include the first image 510 and the second image 520. The first image 510 and the second image 520 may be different from each other. The first image 510 and the second image 520 will be described below in detail.

Figure 4A:
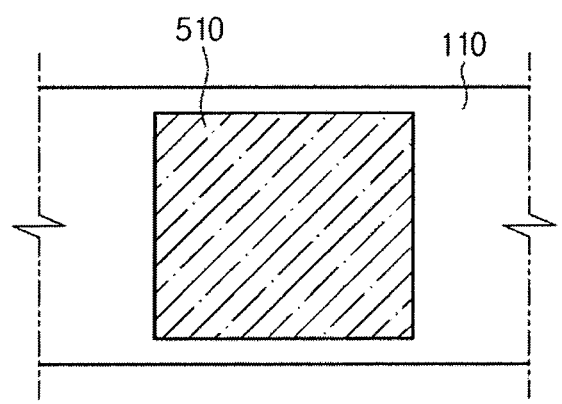
FIG. 4a is a diagram illustrating a first image formed on the display device according to the first embodiment in the electronic appliance.
Figure 4B:
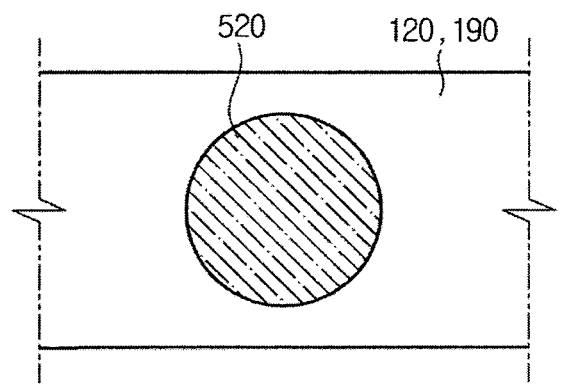
FIG. 4b is a diagram illustrating a second image formed on the display device according to the first embodiment in the electronic appliance.
Figure 4C:
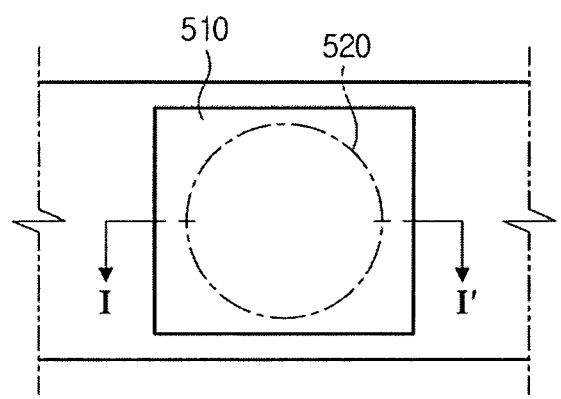
FIG. 4c is a diagram illustrating a disposition relation between the first image and the second image formed on the display device according to the first embodiment in the electronic appliance.

FIG. 4a is a diagram illustrating a first image formed on the display device according to the first embodiment in the electronic appliance. FIG. 4b is a diagram illustrating a second image formed on the display device according to the first embodiment in the electronic appliance. FIG. 4c is a diagram illustrating a disposition relation between the first image and the second image formed on the display device according to the first embodiment in the electronic appliance. Hereinafter, reference numbers not shown in FIG. 4 refer to FIG. 3.

As illustrated in FIG. 4a, the first image 510 may be provided on the first light-guiding layer 110. The first image 510 may be provided on at least one of the first surface 111 and the second surface 112 of the first light-guiding layer 110. The first image 510 may be printed on at least one of the first surface 111 and the second surface 112 of the first light-guiding layer 110. As an example, the first image 510 may be printed on the first light-guiding layer 110 through laser etching. Also, the first image 510 may be provided on a transparent or semi-transparent synthetic resin layer or an adhesive layer that can propagate light. In this case, the synthetic resin layer or the adhesive layer, on which the first image 510 is provided, may be positioned on the first light-guiding layer 110.

Figure 5:
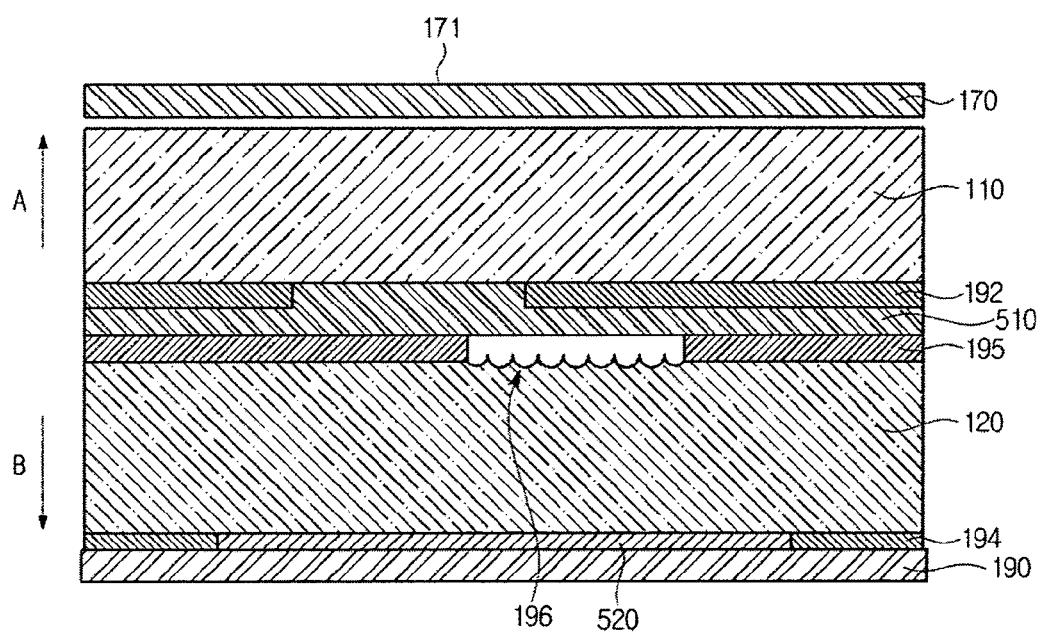
FIG. 5 is a diagram illustrating the display device according to the first embodiment that is partially enlarged in consideration of the first image and the second image taken along the line I-I' of FIG. 4c.

As illustrated in FIG. 4b, the second image 520 may be provided between the second light-guiding layer 120 and the reflection layer 190 (refer to FIG. 5). The second image 520 may be provided on at least one of the second light-guiding layer 120 and the reflection layer 190. The second image 520 may be printed on at least one of the first surface 121 of the second light-guiding layer 120, the second surface 122 of the second light-guiding layer 120, and the reflection layer 190. As an example, the second image 520 may be printed on at least one of the first surface 121 of the second light-guiding layer 120, the second surface 122 of the second light-guiding layer 120, and the reflection layer 190 through laser etching. Also, the second image 520 may be provided on at least one layer of the transparent or semi-transparent synthetic resin layer and the adhesive layer that can propagate light therein. In this case, the layer on which the second image 520 is provided may be positioned on the second light-guiding layer 120 or the reflection layer 190.

As illustrated in FIG. 4c, the first image 510 and the second image 520 may overlap such that the center of the first image 510 is substantially coincident with the center of the second image 520. It is possible to selectively display a plurality of images in a small area through such an image storing structure. Therefore, the first image 510 and the second image 520 may be efficiently disposed.

The first image 510 and the second image 520 may also be offset where the center of the first image 510 and the center of the second image 520 are shifted from each other. The first image 510 and the second image 520 may also be provided to partially overlap.

FIG. 5 is a diagram illustrating the display device according to the first embodiment that is partially enlarged in consideration of the first image and the second image taken along the line I-I' of FIG. 4c. As explained previously, and as shown in FIG. 5, the direction of arrow A is up and the direction of arrow B is down. "Up" may also be referred to as the first direction A, and "down" may also be referred to as the second direction B. Hereinafter, reference numbers not shown in FIG. 5 refer to FIGS. 3 to 4c.

As illustrated in FIG. 5, the display device 100 may further include the reflection layer 190.

The reflection layer 190 may be disposed below the first light-guiding layer 110 and the second light-guiding layer 120 such that light emitted from at least one of the light sources 130 and 140 into the second light-guiding layer 120 can move toward the screen 171.

The display device 100 may further include the first light transmitting layer 192 and the second light transmitting layer 194. The first light transmitting layer 192 may be provided between the first light-guiding layer 110 and the first image 510. The first light transmitting layer 192 can prevent a step that may be generated when the first image 510 is provided on the first light-guiding layer 110. The first light transmitting layer 192 may be printed on the first light-guiding layer 110. Specifically, the first light transmitting layer 192 may be printed on the second surface 112 of the first light-guiding layer 110. The first image 510 and the first light transmitting layer 192 may have different light refractive indices. The light refractive index of the first light transmitting layer 192 may be less than the light refractive index of the first image 510.

The second light transmitting layer 194 may be provided between the second light-guiding layer 120 and the reflection layer 190. The second light transmitting layer 194 can prevent a step that may be generated when the second image 520 is provided between the second light-guiding layer 120 and the reflection layer 190. The second light transmitting layer 194 may be printed on at least one layer of the second light-guiding layer 120 and the reflection layer 190. Specifically, the second light transmitting layer 194 may be printed on at least one of the second surface 122 of the second light-guiding layer 120 and the reflection layer 190. The second image 520 and the second light transmitting layer 194 may have different light refractive indices. The light refractive index of the second light transmitting layer 194 may be less than the light refractive index of the second image 520.

The display device 100 may further include a mask layer 195. The mask layer 195 may be disposed between the first light-guiding layer 110 and the second light-guiding layer 120. The mask layer 195 may be disposed on at least one of the second surface 112 of the first light-guiding layer 110 and the first surface 121 of the second light-guiding layer 120. As an example, as illustrated in FIG. 5, the mask layer 195 may be provided on the first surface 121 of the second light-guiding layer 120 adjacent to the first image 510.

The mask layer 195 may be, for example, the light shielding tape. It is sufficient if a material of the mask layer 195 can block light, and the present disclosure is not limited to the light shielding tape. An adherent layer or an adhesive layer may be formed on at least one surface of the mask layer 195. The mask layer 195 may prevent some components positioned below the mask layer 195 along the thickness direction of the display device 100 from being visible through the screen 171, and improve visibility of an image displayed on the screen 171. Also, the mask layer 195 can prevent light that is emitted from the first light source 130 to the first light-guiding layer 110 from moving in the second direction B.

The mask layer 195 may be disposed on a part of at least one of the second surface 112 of the first light-guiding layer 110 and the first surface 121 of the second light-guiding layer 120 such that the second image 520 can be displayed on the screen 171. When the mask layer 195 is entirely disposed on at least one of the second surface 112 of the first light-guiding layer 110 and the first surface 121 of the second light-guiding layer 120, light that is emitted from the second light source 140 to the second light-guiding layer 120 is blocked while moving in the first direction A. Therefore, the second image 520 may not be displayed on the screen 171.

An uneven structure 196 may be formed on the second light-guiding layer 120. Specifically, the uneven structure 196 may be formed on the first surface 121 of the second light-guiding layer 120. As illustrated in FIG. 5, the first surface 121 of the second light-guiding layer 120 may face the first image 510. The uneven structure 196 can effectively change a refractive index of light of the second light-guiding layer 120 such that light that is introduced into the first light-guiding layer 110 and emitted to the screen 171 and light that is introduced into the second light-guiding layer 120 and emitted to the screen 171 have uniform brightness or luminance. In other words, the uneven structure 196 may scatter light that is emitted from the second light source 140 to the second light-guiding layer 120.

The uneven structure 196 may be formed by at least one of press processing and laser processing.

The uneven structure 196 may be formed on a part of the first surface 121 of the second light-guiding layer 120 that is not blocked by the mask layer 195.

The display device 100 may further include a color filter layer (not illustrated). The color filter layer may be disposed on a path through which the light emitted from at least one of the light sources 130 and 140 takes toward the screen 171. The color filter layer may be produced by various methods such as a dyeing method, an electric coating method, a pigment dispersion method and a printing method. The color filter layer may have transparency.

Figure 6:
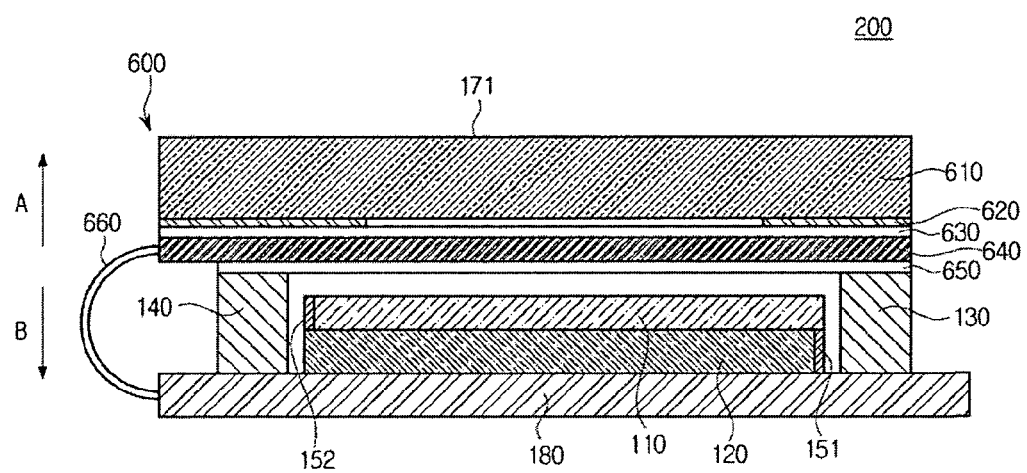
FIG. 6 is a cross-sectional view illustrating a display device according to a second embodiment in the electronic appliance.

FIG. 6 is a cross-sectional view illustrating a display device according to a second embodiment in the electronic appliance. As explained previously, and as shown in FIG. 6, the direction of arrow A is up and the direction of arrow B is down. "Up" may also be referred to as the first direction A, and "down" may also be referred to as the second direction B. Hereinafter, the same descriptions as those in FIGS. 3 to 5 will be omitted. Hereinafter, reference numbers not shown in FIG. 6 refer to FIGS. 3 to 5.

As illustrated in FIG. 6, the display device 200 may further include a touch unit 600.

When the user's hand or an object touches the screen 171, the electronic appliance having the touch unit 600 recognizes a touch position and a position change, identifies a gesture corresponding to the position change, identifies an operation command corresponding to the touch position or an operation command corresponding to the gesture, performs a function corresponding to the identified operation command and displays an image of function execution.

The touch unit 600 is disposed above the first light-guiding layer 110 and the second light-guiding layer 120, and may be electrically connected to the printed circuit board 180. Accordingly, at least one of the light sources 130 and 140 may selectively illuminate the first light-guiding layer 110 and the second light-guiding layer 120 so that the first image 510 and the second image 520 can be selectively displayed.

The touch unit 600 may include a protection panel 610, a blocking layer 620, a first gap portion 630, a touch panel 640 and a second gap portion 650.

The protection panel 610 may be a polymer film or a substrate formed from at least one of polycarbonate (PC) and polyethylene terephthalate (PET). Also, the protection panel 610 may be a glass plate. The protection panel 610 may have an anti-scratch property. The screen 171 may be formed on a surface of the protection panel 610. In other words, the surface of the protection panel 610 may be defined as the screen 171. Or, the screen 171 may be formed by performing an additional process on the surface of the protection panel 610.

The touch panel 640 is disposed to be adjacent to at least one of the light sources 130 and 140 and at least one of the light-guiding layers 110 and 120, and performs a function of outputting a touch signal when the user touches the screen 171. In other words, the touch panel 640 may be disposed above the light sources 130 and 140 and the light-guiding layers 110 and 120 along the thickness direction of the display device 200.

The first gap portion 630 may be disposed between the protection panel 610 and the touch panel 640. Specifically, the first gap portion 630 may be disposed between the blocking layer 620 and the touch panel 640. An optical clear adhesive (OCA) may be in the first gap portion 630.

The second gap portion 650 may be disposed below the touch panel 640 along the thickness direction of the display device 200. In other words, the second gap portion 650 may be disposed below the touch panel 640 and above the light sources 130 and 140 and the light-guiding layers 110 and 120. The second gap portion 650 may be formed as an air gap or have optical clear adhesive in it. The optical clear adhesive may be made of an adhesive composition including at least one of an acrylic resin, a silicone resin, a styrene resin, a polyester resin, a rubber resin and a urethane resin.

The blocking layer 620 may be disposed between the protection panel 610 and the first gap portion 630. The blocking layer 620 may prevent some components positioned below the blocking layer 620 along the thickness direction of the display device 200 from being visible. The blocking layer 620 may be disposed to not interfere with displaying the first image 510 and the second image 520 on the screen 171.

In various embodiments of the disclosure, the light shielding films 161 and 162 (refer to FIG. 3) may be disposed between the light sources 130 and 140 and the second gap portion 650. The light shielding films 161 and 162 may be disposed to prevent the light emitted from the light source 130 and 140 from moving directly to the touch unit 600. The light shielding films 161 and 162 may be disposed to prevent the light emitted from at least one of the light sources 130 and 140 from moving directly in the first direction A without passing through at least one of the light-guiding layers 110 and 120.

The touch unit 600 may further include a flexible printed circuit board 660. The flexible printed circuit board 660 performs a function of delivering a touch signal generated in the touch panel 640 to the printed circuit board 180. The flexible printed circuit board 660 may connect the touch panel 640 and the printed circuit board 180.

Figure 7:
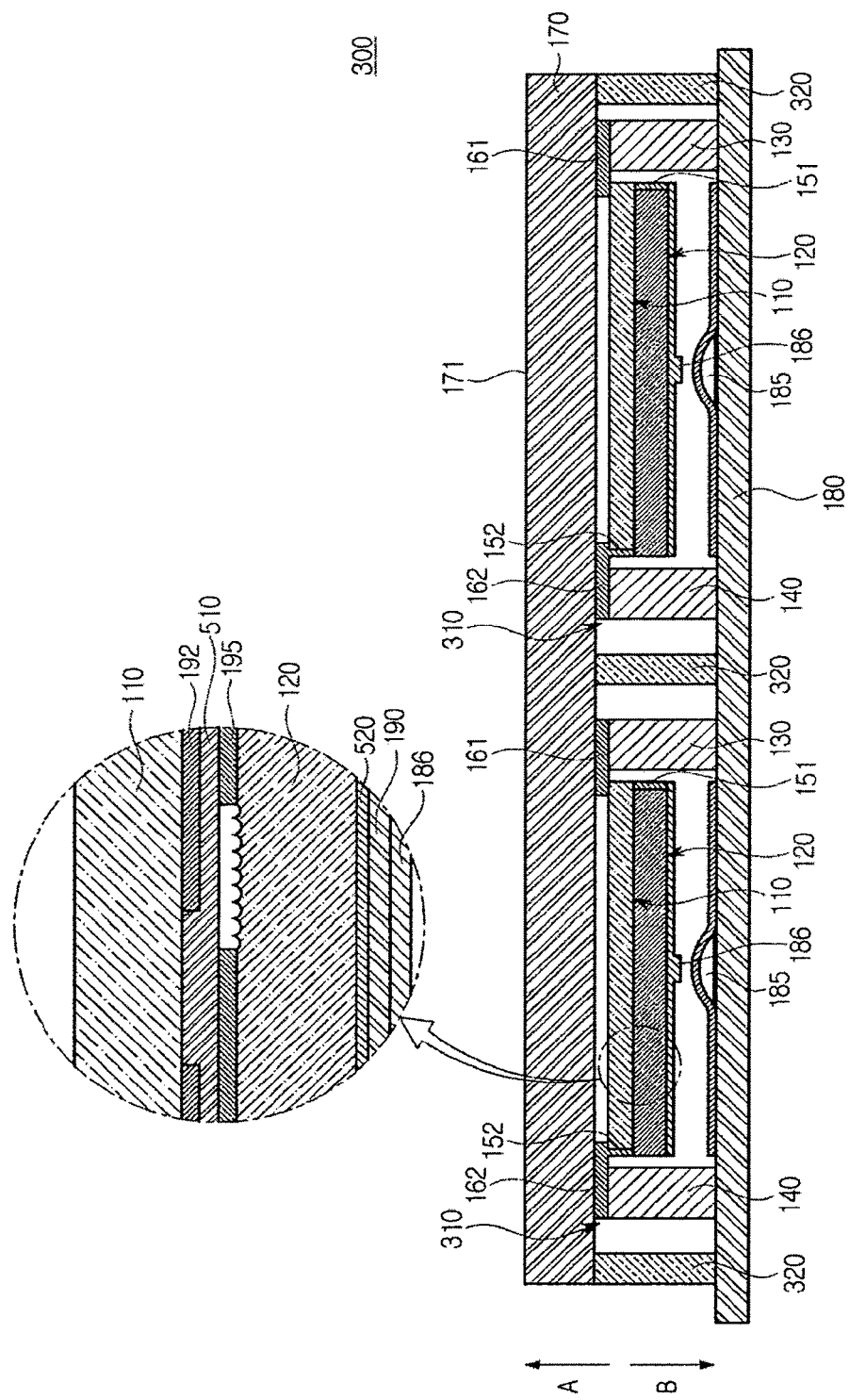
FIG. 7 is a cross-sectional view illustrating a display device according to a third embodiment in consideration of first images and second images taken along the line K-K' of FIG. 8c.
Figure 8A:
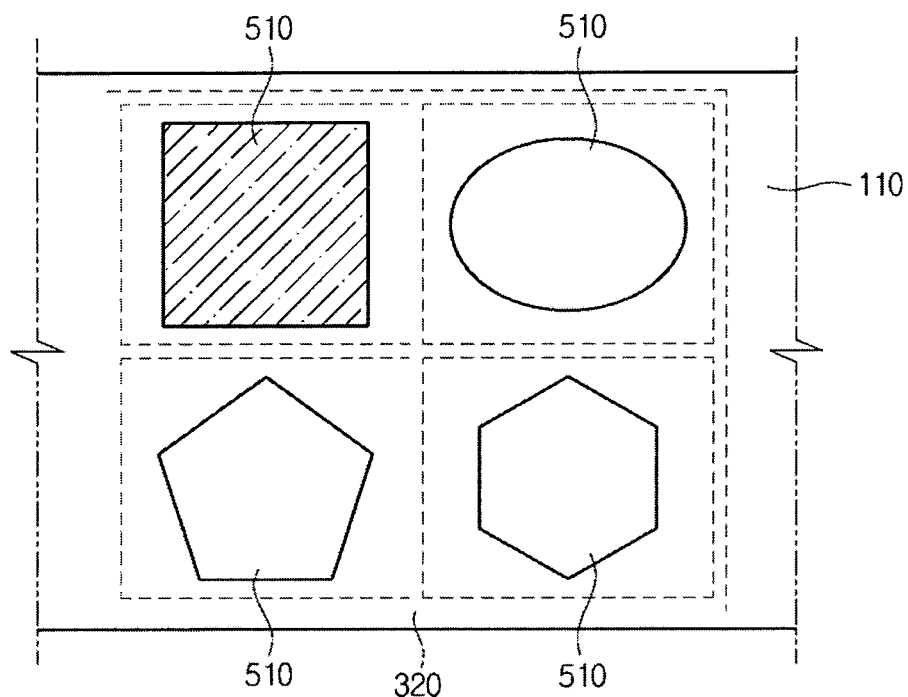
FIG. 8a is a diagram illustrating the first images formed on the display device according to the third embodiment in the electronic appliance.
Figure 8B:
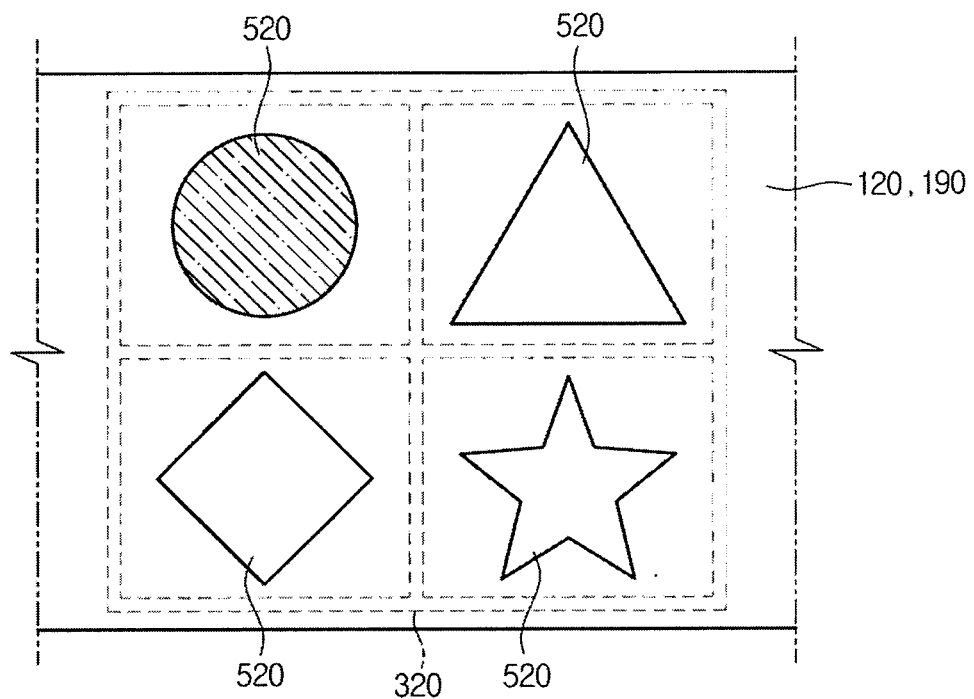
FIG. 8b is a diagram illustrating the second images formed on the display device according to the third embodiment in the electronic appliance.
Figure 8C:
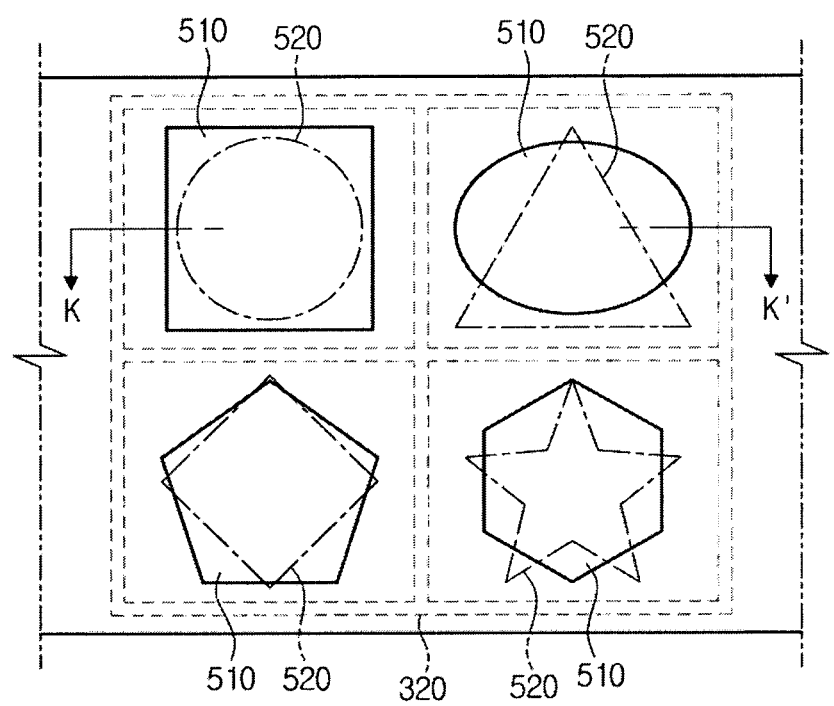
FIG. 8c is a diagram illustrating a disposition relation between the first images and the second images formed on the display device according to the third embodiment in the electronic appliance.

FIG. 7 is a cross-sectional view illustrating a display device according to a third embodiment in consideration of first images and second images taken along the line K-K' of FIG. 8c. FIG. 8a is a diagram illustrating the first images formed on the display device according to the third embodiment in the electronic appliance. FIG. 8b is a diagram illustrating the second images formed on the display device according to the third embodiment in the electronic appliance. FIG. 8c is a diagram illustrating a disposition relation between the first images and the second images formed on the display device according to the third embodiment in the electronic appliance. Hereinafter, the first images 510 and the second images 520 may be selectively displayed on the screen 171. In other words, the first images 510 and the second images 520 may be interchangeably displayed on the screen 171. As explained previously, and as shown in FIG. 7, the direction of arrow A is up and the direction of arrow B is down. "Up" may also be referred to as the first direction A, and "down" may also be referred to as the second direction B. Hereinafter, the same descriptions as those in FIGS. 3 and 5 will be omitted.

As illustrated in FIG. 7, the display device 300 may include a plurality of image implementing units 310.

The plurality of image implementing units 310 may include a plurality of images 510 and 520 that are selectively displayed, at least one of the light-guiding layers 110 and 120 on which the plurality of images 510 and 520 are provided and at least one of the light sources 130 and 140 that are provided to emit light to the light-guiding layers 110 and 120.

The plurality of images 510 and 520 may include the first images 510 and the second images 520. The plurality of images 510 and 520 may be different from each other, and will be described below in detail.

The light-guiding layers 110 and 120 may perform a function of uniformly spreading the light emitted from the light sources 130 and 140 across the entire screen 171. Since descriptions of the light-guiding layers 110 and 120 are the same as those in FIGS. 3 and 5, repeated descriptions will be omitted.

The second light-guiding layer 120 may have a greater thickness than the first light-guiding layer 110 such that an intensity of light that is emitted from the light sources 130 and 140 and introduced into the second light-guiding layer 120 is greater than an intensity of light that is emitted from the light sources 130 and 140 and introduced into the first light-guiding layer 110. Specifically, the second light-guiding layer 120 may have a thickness that is 25% to 45% greater than a thickness of the first light-guiding layer 110 such that brightness and uniformity of light that passes through the first light-guiding layer 110 to go to the screen 171 is the same as that of the light that passes through the second light-guiding layer 120 and the first light-guiding layer 110 to go to the screen 171.

Light emitted from the first light source 130 passes through the first light-guiding layer 110 and then goes to the screen 171. Light emitted from the second light source 140 sequentially passes through the second light-guiding layer 120 and the first light-guiding layer 110, and then goes to the screen 171. Since light emitted from the second light source 140 passes through the first light-guiding layer 110 and the second light-guiding layer 120 and then goes to the screen 171, more light is lost than light emitted from the first light source 130 that passes through the first light-guiding layer 110 and then goes to the screen 171. Therefore, light emitted from the first light source 130 and light emitted from the second light source 140 may have non-uniform brightness or luminance when viewed on the screen 171. As a method of addressing such a problem, the first light-guiding layer 110 and the second light-guiding layer 120 may have different thicknesses. A thickness difference between the first light-guiding layer 110 and the second light-guiding layer 120 will be described below in detail with reference to FIG. 10.

The light sources 130 and 140 may be disposed to selectively illuminate the light-guiding layers 110 and 120. The light sources 130 and 140 may include the first light source 130 and the second light source 140. Since descriptions of the light sources 130 and 140 are the same as those in FIGS. 3 and 5, repeated descriptions will be omitted.

The display device 300 may further include the light shielding units 151 and 152. The light shielding units 151 and 152 may guide light emitted from the first light source 130 and the second light source 140 such that the light emitted from the first light source 130 and the second light source 140 can be introduced into the first light-guiding layer 110 and the second light-guiding layer 120, respectively. The light shielding units 151 and 152 may include the first light shielding unit 151 and the second light shielding unit 152. Since descriptions of the light shielding units 151 and 152 are the same as those in FIGS. 3 and 5, repeated descriptions will be omitted.

The display device 300 may further include the light shielding films 161 and 162. The light shielding films 161 and 162 may be disposed to prevent light emitted from the light sources 130 and the 140 from moving directly to the screen 171. In other words, the light shielding films 161 and 162 may be disposed to prevent the light emitted from the light sources 130 and 140 from moving directly in the first direction A without passing through at least one of the light-guiding layers 110 and 120. The light shielding films 161 and 162 may include the first light shielding film 161 and the second light shielding film 162. Since descriptions of the light shielding films 161 and 162 are the same as those in FIGS. 3 and 5, repeated descriptions will be omitted.

The display device 300 may further include the protection cover 170. Since descriptions of the protection cover 170 are the same as those in FIGS. 3 and 5, repeated descriptions will be omitted.

The display device 300 may further include the printed circuit board 180. The printed circuit board 180 may be disposed below the screen 171 with the plurality of image implementing units 310 and the light shielding units 151 and 152 in between. The plurality of image implementing units 310 and the light shielding unit 151 and 152 may be disposed on the printed circuit board 180.

The display device 300 may further include the switch 185 that is disposed to selectively switch on/off the first light source 130 and the second light source 140. Since descriptions of the switch 185 are the same as those in FIGS. 3 and 5, repeated descriptions will be omitted. The number of switches 185 and their positions may correspond to the number of plurality of image implementing units 310 and their positions.

The display device 300 may further include a light shielding unit 320. The light shielding unit 320 may form a boundary of the plurality of image implementing units 310 such that light emitted from any of the light sources 130 and the 140 among the plurality of image implementing units 310 and light emitted from the other light sources 130 and 140 among the plurality of image implementing units 310 do not interfere with each other.

The light shielding unit 320 may be disposed between the plurality of image implementing units 310. Specifically, the light shielding unit 320 may be disposed between the plurality of image implementing units 310 that are adjacent to each other. The light shielding unit 320 may be disposed along a circumference of each of the plurality of image implementing units 310.

The light shielding unit 320 may be disposed between the protection cover 170 and the printed circuit board 180 to form a boundary of the plurality of image implementing units 310. The light shielding unit 320 may be connected to at least one of the protection cover 170 and the printed circuit board 180. The light shielding unit 320 may be integrally formed with at least one of the protection cover 170 and the printed circuit board 180.

As illustrated in FIG. 8a, the first images 510 may be provided on the first light-guiding layer 110. The first images 510 may be provided on at least one of the first surface 111 and the second surface 112 of the first light-guiding layer 110. The first images 510 may be, for example, printed on at least one of the first surface 111 and the second surface 112 of the first light-guiding layer 110. As an example, the first images 510 may be printed on the first light-guiding layer 110 through laser etching. Also, the first images 510 may be provided on at least one layer of the transparent or semi-transparent synthetic resin layer and the adhesive layer that can propagate light therein. In this case, at least one layer of the synthetic resin layer and the adhesive layer on which the first images 510 are provided may be positioned on the first light-guiding layer 110.

As illustrated in FIG. 8b, the second images 520 may be provided between the second light-guiding layer 120 and the reflection layer 190. The second images 520 may be provided on at least one of the second light-guiding layer 120 and the reflection layer 190. The second images 520 may be, for example, printed on at least one of the first surface 121 of the second light-guiding layer 120, the second surface 122 of the second light-guiding layer 120 and the reflection layer 190. As an example, the second images 520 may be printed on at least one of the first surface 121 of the second light-guiding layer 120, the second surface 122 of the second light-guiding layer 120 and the reflection layer 190 through laser etching. Also, the second images 520 may be provided on at least one layer of the transparent or semi-transparent synthetic resin layer and the adhesive layer that can propagate light therein. In this case, at least one layer of the synthetic resin layer and the adhesive layer on which the second images 520 are provided may be positioned on at least one layer of the second light-guiding layer 120 and the reflection layer 190.

As illustrated in FIG. 8c, the first images 510 and the second images 520 may be provided to substantially overlap in the display device 300. In other words, the first images 510 and the second images 520 may be provided such that respective centers of the first images 510 substantially coincide with the respective centers of the second images 520. It is thus possible to selectively display the plurality of images 510 and 520 in a small area through such an image disposition structure. Therefore, the plurality of images 510 and 520 may be efficiently disposed.

The first images 510 and the second images 520 may also be provided to be offset in the display device 300. In other words, the first images 510 and the second images 520 may be provided such that the respective centers of the first images 510 and respective centers of the second images 520 are shifted from each other. The first images 510 and the second images 520 may also be provided to partially overlap in the display device 300.

Figure 9:
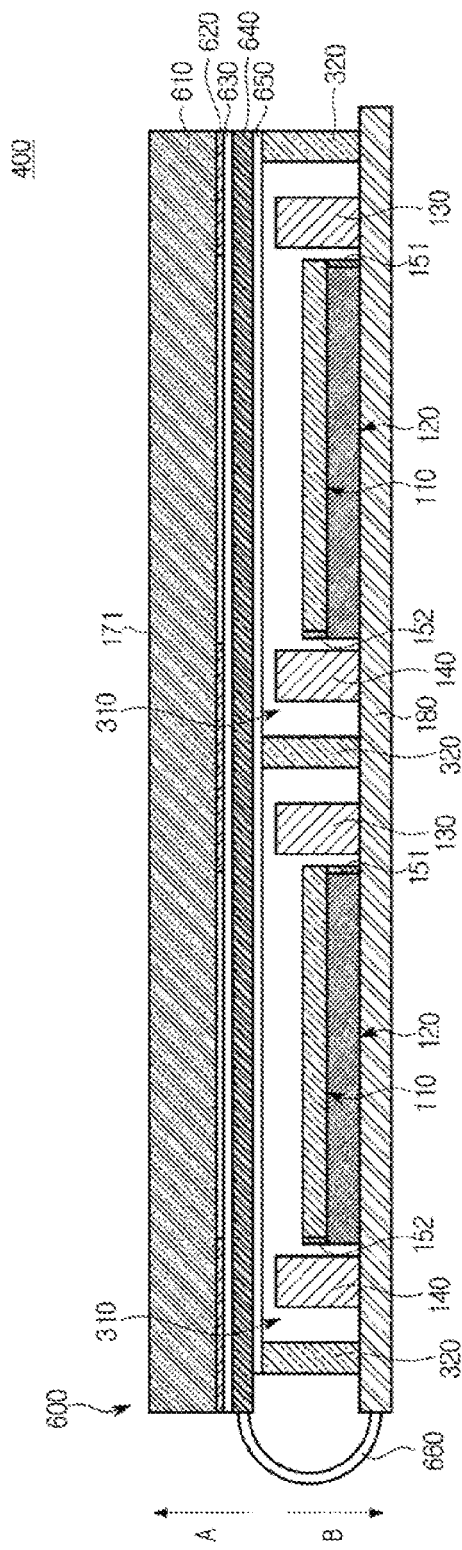
FIG. 9 is a cross-sectional view illustrating a display device according to a fourth embodiment in the electronic appliance.

FIG. 9 is a cross-sectional view illustrating a display device according to a fourth embodiment in the electronic appliance according to an embodiment of the present disclosure. As explained previously, and as shown in FIG. 9, the direction of arrow A is up and the direction of arrow B is down. "Up" may also be referred to as the first direction A, and "down" may also be referred to as the second direction B. Hereinafter, the same descriptions as those in FIGS. 6 and 7 to 8c will be omitted. Hereinafter, reference numbers not shown in FIG. 9 refer to FIGS. 7 to 8c.

As illustrated in FIG. 9, the display device 400 may further include the touch unit 600. The touch unit 600 is disposed above the printed circuit board 180 with the plurality of image implementing units 310 in between. The touch unit 600 may be electrically connected to the printed circuit board 180 such that at least one of the light sources 130 and 140 selectively illuminate the first light-guiding layer 110 and the second light-guiding layer 120, and the first images 510 and the second images 520 can be selectively displayed.

The touch unit 600 may include the protection panel 610, the blocking layer 620, the first gap portion 630, the touch panel 640, the second gap portion 650 and the flexible printed circuit board 660. Since descriptions of the touch unit 600 are the same as those in FIG. 6, repeated descriptions will be omitted.

FIG. 10 is a table showing uniformity of optical quality according to a thickness ratio of a first light-guiding layer and a second light-guiding layer in the electronic appliance according to an embodiment of the present disclosure. The first light-guiding layer 110 and the second light-guiding layer 120 have a thickness unit of micrometer (μm). The first light-guiding layer 110 and the second light-guiding layer 120 have a brightness unit of candela (cd).

As illustrated in FIG. 10, the second light-guiding layer 120 may have a thickness that is 25% to 45% greater than a thickness of the first light-guiding layer 110 such that brightness of light that passes through the first light-guiding layer 110 or through both the second light-guiding layer 120 and the first light-guiding layer 110 and is emitted to the screen 171 becomes uniform.

When the first light-guiding layer 110 has a thickness of 0.7 μm, if the second light-guiding layer 120 has a thickness of 0.9 μm or more and 1.0 μm or less, the first light-guiding layer 110 and the second light-guiding layer 120 has similar brightness. That is, when the thickness of the second light-guiding layer 120 is 25% to 45% increased with respect to the thickness of the first light-guiding layer 110, light that passes through at least one of the first light-guiding layer 110 and the second light-guiding layer 120 and is emitted to the screen 171 has uniform brightness.

Specific embodiments have been illustrated and described above. However, the present disclosure is not limited to the above embodiments, and it may be understood by those skilled in the art that various modifications and alterations may be made without departing from the spirit and scope of the present disclosure described in the appended claims.

When the second light-guiding layer is produced to have a greater thickness than a thickness of the first light-guiding layer, it is possible to uniformly maintain brightness or luminance of light that passes through at least one of the first light-guiding layer and the second light-guiding layer and is emitted to the screen.

When the light shielding unit is disposed among the plurality of image implementing units, it is possible to prevent light emitted from any light source among the plurality of image implementing units and light emitted from the other light source among the plurality of image implementing units from interfering with each other.

It is possible to easily manipulate selective on/off switching of the first light source and the second light source using a dome switch or a touch unit.

When at least one light-guiding layer is used on which are provided a plurality of images that can be switched, it is possible to simply and efficiently dispose the plurality of images that indicate the various functions of the electronic appliance.

What is claimed is:

1. An electronic appliance, comprising
 a display device configured to display a plurality of images,
 wherein the display device includes:
 a first image and a second image that are selectively displayed;
 a first light-guiding layer disposed below a screen;
 a second light-guiding layer disposed below the first light-guiding layer; and
 at least one light source disposed to selectively illuminate the first light-guiding layer and the second light-guiding layer,
 wherein the second light-guiding layer has a thickness that is 25% to 45% greater than a thickness of the first light-guiding layer such that an intensity of light that is emitted from the at least one light source and introduced into the second light-guiding layer is greater than an intensity of light that is emitted from the at least one light source and introduced into the first light-guiding layer.

2. The electronic appliance according to claim 1, wherein the at least one light source includes a first light source configured to emit a first light and a second light source configured to emit a second light that are disposed to face the first light-guiding layer and the second light-guiding layer.

3. The electronic appliance according to claim 2, wherein the display device further includes a light shielding unit configured to guide the first light and the second light to the first light-guiding layer and the second light-guiding layer, respectively.

4. The electronic appliance according to claim 3, wherein the light shielding unit includes:
   a first light shielding unit provided between the first light source and the second light-guiding layer such that the first light is introduced into the first light-guiding layer; and
   a second light shielding unit provided between the second light source and the first light-guiding layer such that the second light is introduced into the second light-guiding layer.

5. The electronic appliance according to claim 1, wherein the second image is provided on the second light-guiding layer.

6. The electronic appliance according to claim 1,
   wherein the display device further includes a reflection layer that is disposed to face the first light-guiding layer with the second light-guiding layer in between such that light emitted from the at least one light source into the second light-guiding layer is able to move toward the screen, and
   wherein the second image is provided between the second light-guiding layer and the reflection layer.

7. The electronic appliance according to claim 6, wherein the first image and the second image are printed on the first light-guiding layer and the reflection layer, respectively, through laser etching.

8. The electronic appliance according to claim 1, further comprising an uneven structure to effectively alter a refractive index of light of the second light-guiding layer.

9. The electronic appliance according to claim 8, wherein the uneven structure is formed by at least one of press processing and laser processing.

10. The electronic appliance according to claim 1, wherein the display device further includes a protection cover, which has a surface on which the screen is formed and is disposed on the first light-guiding layer, having an anti-scratch property.

11. The electronic appliance according to claim 1, wherein the first light-guiding layer and the second light-guiding layer include at least one of polycarbonate (PC), polyurethane (PU), polyethylene terephthalate (PET) and polymethyl methacrylate (PMMA) material.

12. The electronic appliance according to claim 1, wherein the display device further includes:
   a printed circuit board that is disposed below the second light-guiding layer; and
   a dome switch configured to deliver an electrical signal to the printed circuit board such that the at least one light source selectively illuminates the first light-guiding layer and the second light-guiding layer and the first image and the second image are selectively displayed.

13. The electronic appliance according to claim 12,
   wherein the dome switch is provided on the printed circuit board, and
   wherein a pressing unit protruding toward the dome switch is provided on the second light-guiding layer to selectively press the dome switch.

14. The electronic appliance according to claim 1, wherein the display device further includes:
   a printed circuit board that is disposed to face the second light-guiding layer; and
   a touch unit that is disposed over the second light-guiding layer with the first light-guiding layer in between and electrically connected to the printed circuit board such that the at least one light source selectively illuminates the first light-guiding layer and the second light-guiding layer, and the first image and the second image are selectively displayed.

15. An electronic appliance, comprising:
   a display device, wherein the display device includes:
      a plurality of image implementing units that include a plurality of images that are selectively displayed, at least one light-guiding layer on which the plurality of images are provided and at least one light source that is provided to illuminate the at least one light-guiding layer;
      a light shielding unit that separates adjacent ones of the plurality of image implementing units such that light emitted from any light source among the plurality of image implementing units and light emitted from any other light source among the plurality of image implementing units do not interfere with each other; and
      a printed circuit board that is disposed below a screen with the plurality of image implementing units and the light shielding unit in between,
   wherein:
      the plurality of image implementing units includes a first image implementing unit and a second image implementing unit disposed in a longitudinal direction of the printed circuit board, and
      the light shielding unit is disposed between the first image implementing unit and the second image implementing unit.

16. The electronic appliance according to claim 15,
   wherein the at least one light-guiding layer includes:
      a first light-guiding layer that is disposed below a screen and on which a first image is provided; and
      a second light-guiding layer that is below the first light-guiding layer and on which a second image is provided, and
   wherein the second light-guiding layer has a thickness that is 25% to 45% greater than a thickness of the first light-guiding layer such that brightness of light that passes through at least one of the first light-guiding layer and the second light-guiding layer and is emitted to the screen becomes uniform.

17. The electronic appliance according to claim 15, wherein the at least one light source includes a first light source and a second light source that are disposed to face the at least one light-guiding layer.

18. The electronic appliance according to claim 15, wherein the light shielding unit is disposed along a perimeter of each of the plurality of image implementing units.

19. The electronic appliance according to claim 15, wherein the display device further includes:
   a dome switch that is electrically connected to the printed circuit board such that the at least one light source selectively illuminates the at least one light-guiding layer.

20. The electronic appliance according to claim 19, wherein the display device further includes a protection cover that has a surface on which the screen is formed and has an anti-scratch property.

21. The electronic appliance according to claim 20, wherein a light shielding film is disposed between the protection cover and the at least one light source to prevent light emitted from the at least one light source from moving directly to the protection cover.

22. The electronic appliance according to claim 15, wherein the plurality of image implementing units and the light shielding unit are disposed on the printed circuit board, and the display device further includes
      a touch unit that is electrically connected to the printed circuit board such that the at least one light source selectively illuminates the at least one light-guiding layer and has a surface on which the screen is formed.

23. The electronic appliance according to claim 15, wherein the printed circuit board configured to house circuitry and/or elements to control at least some of the display device, and the display device further comprises
   a touch unit configured to receive input and provide the input to the printed circuit board.

\* \* \* \* \*